United States Patent

Watson

Patent Number: 5,816,968
Date of Patent: Oct. 6, 1998

[54] IDLER SPROCKET ASSEMBLY FOR A PHASED CHAIN SYSTEM

[75] Inventor: Stephen P. Watson, Freeville, N.Y.

[73] Assignee: Borg-Warner Automotive, Inc., Sterling Heights, Mich.

[21] Appl. No.: 898,585

[22] Filed: Jul. 22, 1997

Related U.S. Application Data

[63] Continuation of Ser. No. 595,038, Jan. 31, 1996, Pat. No. 5,690,568.

[51] Int. Cl.⁶ .................................................. F16H 7/00
[52] U.S. Cl. ............................ 474/84; 474/152; 474/900; 474/903; 74/379
[58] Field of Search ............................ 474/84, 85, 152, 474/900, 903; 74/379; 305/139, 140

[56] References Cited

U.S. PATENT DOCUMENTS

| | | | |
|---|---|---|---|
| 1,020,900 | 3/1912 | Hadley . | |
| 3,949,619 | 4/1976 | Kuehl | 475/85 X |
| 4,083,094 | 4/1978 | Silvestri | 29/159.2 |
| 4,158,316 | 6/1979 | Strong | 474/73 |
| 4,416,650 | 11/1983 | Wilkins | 474/161 |
| 4,889,521 | 12/1989 | Nagano | 474/164 |
| 5,427,580 | 6/1995 | Ledvina et al. | 474/84 |
| 5,480,357 | 1/1996 | Liang | 474/164 X |
| 5,569,107 | 10/1996 | Mu | 474/160 |
| 5,690,568 | 11/1997 | Watson | 474/85 |
| 5,704,859 | 1/1998 | Feng et al. | 474/78 |

*Primary Examiner*—Roger J. Schoeppel
*Attorney, Agent, or Firm*—Hugh A. Abrams, Esq.; Greg Dziegielewski, Esq.

[57] ABSTRACT

A chain and sprocket system includes a plurality of chains and sprockets. The system includes a crankshaft, an idler shaft and two overhead camshafts. The two sprockets on the idler shaft that connect by chain to drive the camshafts are phased or offset with respect to each other to alter the impact and chordal action generated noise. These idler camshaft sprockets and the idler sprocket of the crankshaft are all manufactured separately and then placed together on a spline or hub. In this way, the idler sprocket assembly consists of four parts, which eases manufacture and assembly.

3 Claims, 3 Drawing Sheets

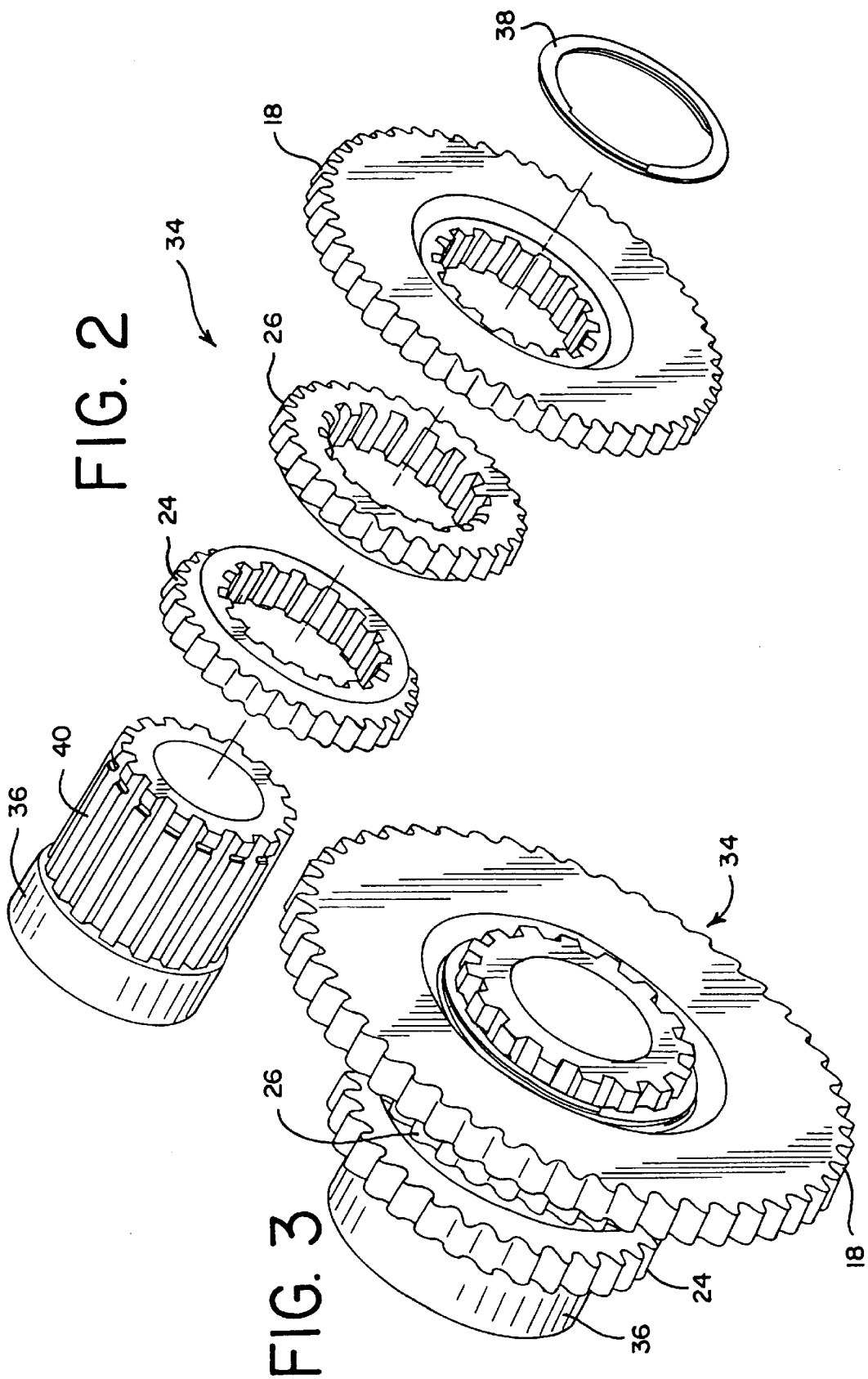

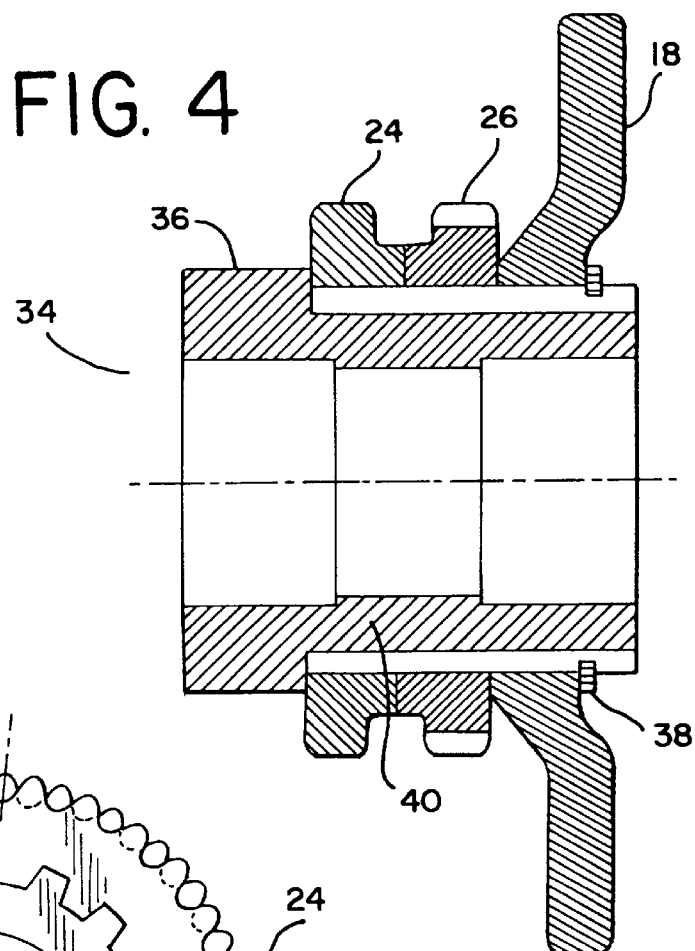
FIG. 4
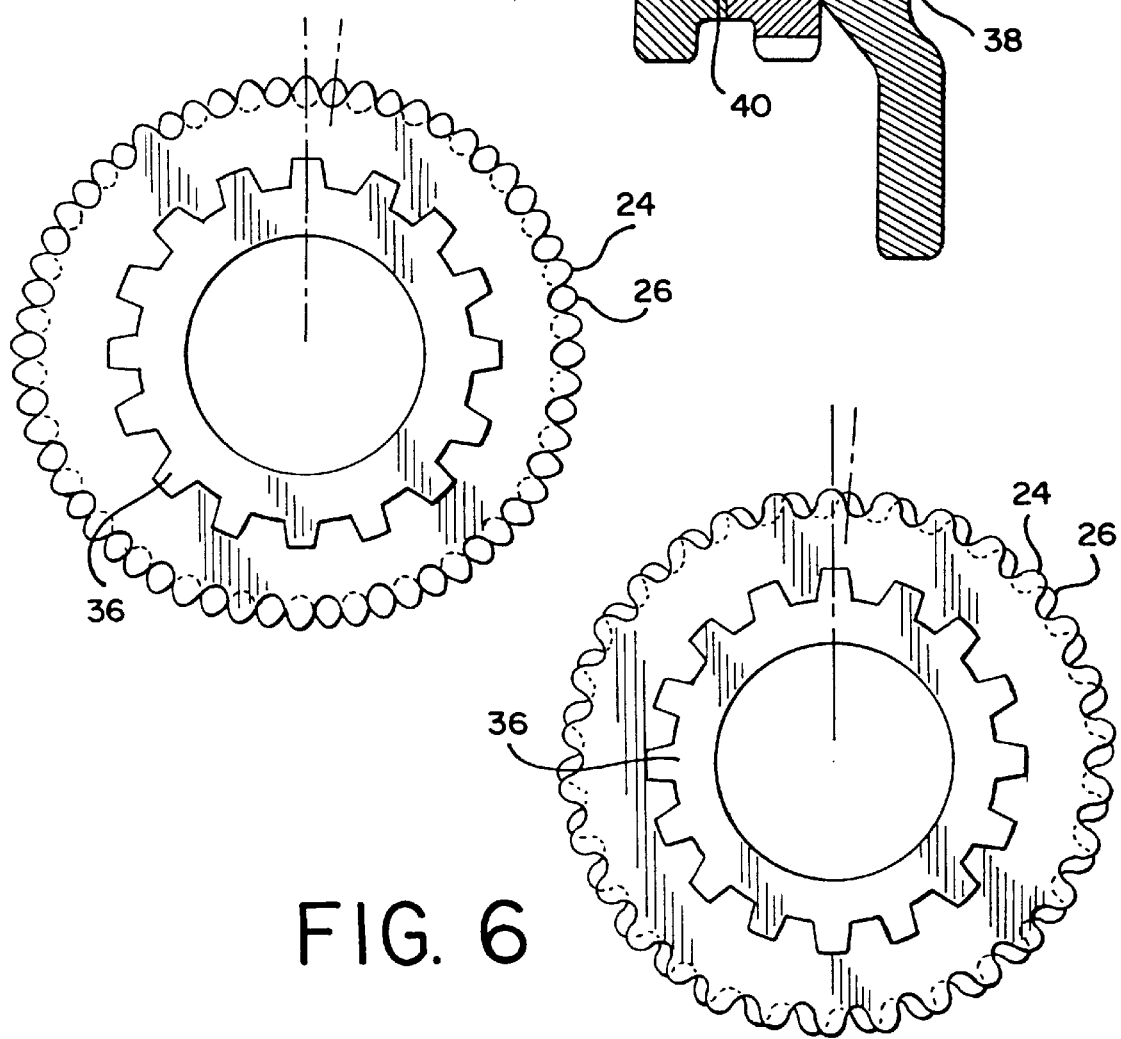
FIG. 5
FIG. 6

IDLER SPROCKET ASSEMBLY FOR A PHASED CHAIN SYSTEM

This application is a continuation of Ser. No. 08/595,038, filed Jan. 31, 1996, now U.S. Pat. No. 5,690,568.

BACKGROUND OF THE INVENTION

The present invention relates generally to power transmission chains, and more particularly, to a power transmission chain system in which the chains are phased or offset by a portion of a pitch length. The phasing of the chain and sprocket system modifies the noise characteristics of the system.

Power transmission chains are widely used in the automotive industry in automobile transmission systems as well as in engine timing drives. Engine timing systems conventionally include at least one driving sprocket located on the crankshaft and at least one driven sprocket located on a camshaft. Rotation of the crankshaft causes rotation of the camshaft through a chain and sprocket system.

Another type of engine timing system connects the crankshaft with two overhead camshafts by a chain and sprocket system. The crankshaft connects directly to the camshafts or through an idler sprocket. In an idler sprocket system, the idler sprocket and one sprocket of each camshaft are conventionally machined on the same spline or hub. Rotation of the idler sprocket therefore causes rotation of both of the camshaft sprockets. The sizing of the idler sprocket is such as to allow different rotational speeds of the crankshaft and the camshafts.

Noise is associated with chain drives. Noise is generated by a variety of sources, including the impact sound generated by the collision of the chain and the sprocket at the onset of meshing, and the chordal action of the chains and sprockets.

As to the impact sound generated, loudness is affected by, among other things, the impact velocity between the chain and the sprocket, and the mass of chain links contacting the sprocket at a particular moment or time increment. The meshing impact sound is generally a periodic sound in chain drives because the impact sound is repeated with a frequency generally equal to that of the frequency of the chain meshing with the sprocket. The frequency is related to the number of teeth on the sprocket and the speed of the sprocket. The impact can therefore produce sound having objectionable pure sonic tones.

Chordal action occurs as the chain link enters the sprocket from the free chain. The meshing of the chain and sprocket at the chain mesh frequency can cause a movement of the free chain or span (the part of the chain between the sprockets) in a direction perpendicular to the chain travel but in the same plane as the chain and sprockets. This vibratory movement can also produce an objectionable pure sonic tone at the frequency of the chain mesh frequency or a derivative thereof.

Many efforts have been made to decrease the noise level and pitch frequency distribution in chain drives so as to minimize the objectionable effects of the pure sonic tones. For example, U.S. Pat. No. 5,427,580, which is incorporated herein by reference, discloses the phasing of sprockets so as to modify the impact generated noise spectrum as well as the chordal action noise spectrum. The present invention utilizes the concepts taught in U.S. Pat. No. 5,427,580, in an idler sprocket system.

The phased chain system of the present invention includes phasing of the sprockets of two overhead camshafts with respect to one another along the idler shaft. Phasing the camshaft sprockets can reduce the number of chain link teeth (or mass of chain) impacting the sprockets at the idler shaft during a given time increment. Similarly, phasing the sprockets can alter or phase the chordal action or articulation of the chains and sprockets, and the resulting impact and chordal action generated noise.

Prior art chain drives have provided for the phasing of the overhead camshafts. However, in these chain drives, the idler sprocket and one sprocket of each camshaft are machined on a single hub along the idler shaft. Such a system requires a complicated manufacturing process to machine three sprockets on a single hub.

In contrast, the present invention utilizes an idler sprocket assembly formed of four separate pieces. The idler sprocket system includes an idler sprocket, as well as two additional sprockets (one for each camshaft) along a spline or hub. Each of the sprockets have internal teeth which are positioned on the spline. Rotation of the idler sprocket causes rotation of the entire system along the spline. The sprocket assembly of the present invention provides advantages in the manufacture of separate sprockets, instead of a single, three-piece system, and advantages in assembly onto the spline.

SUMMARY OF THE INVENTION

The present invention relates to phased chain assemblies or systems and in particular, to an idler sprocket assembly formed of a plurality of sprockets placed on a spline or hub.

The present invention is directed to providing a phased relationship between a pair of sprockets in a chain system. Phasing is provided to modify the impact generated noise spectrum as well as the chordal action generated noise spectrum. Phasing can be accomplished by phasing or offsetting the sprockets by one-half tooth (one-half pitch) or by one-quarter tooth (one-quarter pitch), or any other desired amount of phasing.

In the present invention, the engine timing system connects the crankshaft with two overhead camshafts by a chain and sprocket system. The crankshaft is connected by a chain to an idler sprocket. Each of the two overhead camshafts are connected to the idler sprocket system by a sprocket on the idler shaft. The one sprocket for each camshaft drive and the idler sprocket are all placed together along a spline or hub to form the idler sprocket assembly. For purposes of this application, the two sprockets on the idler shaft that connect by chain to drive the camshafts will be called "idler cam sprockets" and the single sprocket on the idler shaft that connects by chain to the crankshaft will be called the "idler sprocket." The idler cam sprockets and the idler sprocket each has internal keyways, or internal teeth, which allow the sprockets to be slid onto the spline, which has the same number of keyways, or teeth. In addition, the idler cam sprockets and the idler sprocket each has keyways, or teeth, along its circumference to engage the chain associated with its particular drive. The two idler cam sprockets are positioned on the spline or hub to be phased with respect to each other. Again, phasing can be one-half tooth (one-half pitch) or by one-quarter tooth (one-quarter pitch), or any other desired amount of phasing.

During assembly of the engine timing system, the spline is positioned along the idler shaft, which is located between the crankshaft and the two overhead camshafts. First, one idler cam sprocket is positioned on the spline. Then, the second idler cam sprocket is positioned on the spline, but its outer teeth are circumferentially offset or phased with respect to the first idler cam sprocket. For purposes of this application, "rotation" of one sprocket with respect to another will be defined as rotating one sprocket from a first position of circumferential alignment of both outer sprocket teeth and inner spline teeth of both sprockets to a second position where one sprocket has been rotated by a specified number of internal spline teeth or outer sprocket teeth (and fractions thereof), before placement on the spline in an assembled position. In addition, for purposes of this application, circumferential "offset" of one sprocket with respect to another will be defined as the fractional part of a sprocket tooth that one sprocket is circumferentially offset or positioned with respect to a sprocket tooth on the adjacent sprocket after assembly on the spline.

Depending on the desired phasing, the second idler cam sprocket is rotated with respect to the first idler cam sprocket by a predetermined number of spline teeth. After both idler cam sprockets are positioned on the spline or hub, the idler sprocket, which again connects by chain to the crankshaft, is placed on the spline. A snap ring is then positioned to hold the idler sprocket assembly together.

BRIEF DESCRIPTION OF THE DRAWINGS

FIG. 2 is an exploded, perspective view of the present invention illustrating the components of the idler sprocket assembly;

FIG. 3 is a perspective view of the present invention illustrating the assembled components;

FIG. 4 is a sectional side view of the present invention;

FIG. 5 is a side view of the present invention, with the camshaft sprockets phased at one-half tooth; and FIG. 6 is a side view of the present invention, with the camshaft sprockets phased at one-quarter tooth.

DETAILED DESCRIPTION OF THE PREFERRED EMBODIMENTS

Figure 1:
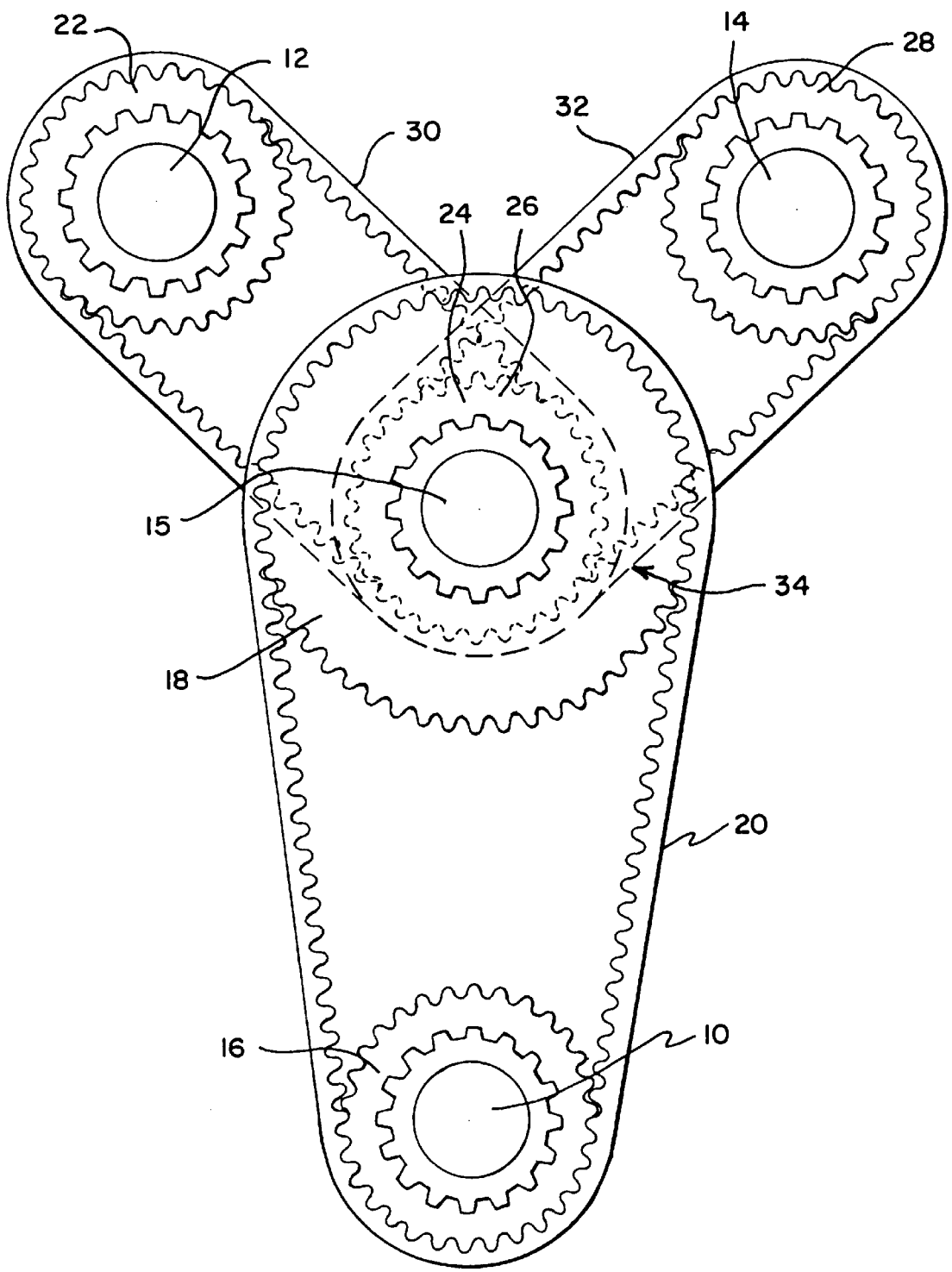
FIG. 1 is a schematic illustrating a timing chain system with a crankshaft, an idler shaft and two overhead camshafts.

Turning now to the drawings, in one embodiment, the current invention is directed to phased chain assemblies and in particular to provide phasing of the idler sprockets. Phasing is provided to modify the impact generated noise spectrum as well as the chordal action noise spectrum associated with the camshafts.

FIG. 1 illustrates a timing chain system with a crankshaft 10, two overhead camshafts 12, 14 and an idler shaft 15. The crankshaft 10 has a single sprocket 16. Sprocket 18 is an idler sprocket. The crankshaft 10 drives the idler shaft 15 through the chain 20 that interconnects crankshaft sprocket 16 and idler sprocket 18. Two additional sprockets 24, 26 are provided on the idler shaft 15 to drive the camshafts 12, 14. Idler cam sprocket 24 drives the first camshaft 12 through chain 30 and camshaft sprocket 22. In a similar manner, idler cam sprocket 26 drives the second camshaft 14 through chain 32 and camshaft sprocket 28. The idler sprocket 18 and the two idler cam sprockets 24, 26 for each of the camshafts 12, 14 form an idler sprocket assembly 34, along hub 36.

FIG. 2 illustrates the assembly of the idler sprocket assembly 34 of the present invention. The idler sprocket assembly 34 positions the three separate sprockets 18, 24, 26 along a spline portion 40 that extends from hub 36. Each of the sprockets 18, 24, 26 has inner keyways or passages to permit attachment of the sprockets to the spline 40.

First, the hub 36 with spline 40 is positioned along the idler shaft 15. The idler sprocket 18, and the camshaft sprockets 24, 26 each have keyways or internal teeth. These internal teeth are such as to allow the sprockets 18, 24, 26 to be slid onto the spline 40 and match the keyways between the spline 40 teeth. In one embodiment, the spline 40 has the same number of teeth around its circumference as the sprockets 18, 24, 26 have internal teeth. Next, the idler cam sprocket 24 is slid onto the spline 40. In these figures, the idler cam sprocket 24 is connected to the left bank camshaft by chain 30. However, the first sprocket positioned on the spline can be connected to drive either the left bank camshaft or the right bank camshaft. In such a system, the remaining idler cam sprocket is connected to drive the remaining left or right bank camshaft.

Next, the second idler cam sprocket 26 is slid onto the spline 40. The second idler cam sprocket 26 is positioned so as to be offset, or phased, from the first idler cam sprocket 24 by a predetermined number of spline 40 teeth in order to achieve phasing of one-quarter pitch or one-half pitch, or another desired amount of phasing or offset of the outer sprocket teeth. Next, the idler sprocket 18 is slid onto the spline 40. Finally, a snap ring 38 is positioned to hold the idler sprocket assembly 34 together on the spline 40. FIG. 3 illustrates an assembled idler sprocket assembly 34, while FIG. 4 illustrates a sectional side view of an assembled idler sprocket assembly 34.

Turning now to FIGS. 5 and 6 to illustrate how one-quarter tooth (one-quarter pitch) or one-half tooth (one-half pitch) phasing is accomplished. FIG. 5 illustrates one-half pitch phasing, while FIG. 6 illustrates one-quarter pitch phasing. The one-half or one-quarter tooth phasing refers to the amount that one idler cam sprocket is circumferentially offset from the other idler cam sprocket. The phasing of one-quarter pitch or one-half pitch is accomplished in one preferred embodiment by the use of idler cam sprockets with thirty teeth along their outer circumference and sixteen internal teeth for contacting the spline. Of course, other configurations may be used. The number of spline teeth that one idler cam sprocket must be offset with respect to the second idler cam sprocket is determined by the following ratio:

$$\frac{\text{outer sprocket teeth}}{\text{spline teeth}} = \frac{\text{number of sprocket teeth offset}}{\text{number of spline teeth rotated}}$$

The particular phasing of the idler cam sprockets is determined by the number of sprocket teeth offset. Depending on the number of spline teeth rotated, i.e., how many spline teeth the second idler cam sprocket is rotated with respect to the first idler cam sprocket before being placed on the spline, the number of sprocket teeth offset may not be a whole number. The number of sprocket teeth offset will usually consist of a whole number and a fractional number. The amount of sprocket tooth phasing is determined by the fractional part of the number of sprocket teeth offset.

When the fractional part of the number of sprocket teeth offset is ½, then the second idler cam sprocket is offset ½ outer sprocket teeth from the first idler cam sprocket. One-half phasing of the idler cam sprockets is thus accomplished. Similarly, when the fractional part is ¼ or ¾, the second idler cam sprocket is offset ¼ or ¾ outer sprocket teeth with respect to the first idler cam sprocket. In either case, one-quarter phasing of the idler cam sprockets is obtained.

Therefore, in order to calculate the amount of spline teeth rotation, first, a ratio of outer sprocket teeth to internal spline teeth is determined. For example, in one preferred embodiment with both idler cam sprockets having 30 outer sprocket teeth and 16 internal teeth (or 16 spline teeth), the ratio is 30/16 or 1.875. Second, the number of spline teeth that one idler cam sprocket must be rotated with respect to the second idler cam sprocket to obtain one-quarter or one-half phasing is determined from the above-stated ratios. Again, to obtain this phasing, the fraction part of the number of sprocket teeth offset must be ½ for one-half phasing, or ¼ or ¾ for one-quarter phasing.

For the one preferred embodiment, it is determined by the ratios that if the second idler cam sprocket 26 is offset by four spline teeth with respect to the first idler cam sprocket 24, then one-half pitch phasing is accomplished. In particular, an offset of four spline 40 teeth multiplied by the ratio of outer sprocket teeth to spline teeth, or 4×1.875, is 7½ sprocket teeth of offset. Thus, the rotation of one idler cam sprocket with respect to the other idler cam sprocket by four internal spline teeth before placement on the spline results in 7½ sprocket teeth rotation, which corresponds to ½ tooth phasing. Again, the fraction part is ½ and therefore the second idler cam sprocket 26 is offset by ½ outer sprocket teeth from the first idler cam sprocket 24, and one-half phasing is obtained.

For this preferred embodiment, if the second idler cam sprocket 26 is rotated by two spline 40 teeth, with respect to the first idler cam sprocket 24, then one-quarter phasing is accomplished. In particular, an offset of two spline 40 teeth multiplied by the ratio of sprocket teeth to spline teeth, or 2×1.875, is 3¾ sprocket teeth of offset. Thus, the rotation of one idler cam sprocket with respect to the other idler cam sprocket by two internal spline teeth before placement on the spline results in 3¾ sprocket teeth rotation, which corresponds to ¼ tooth phasing. Again, the fraction part is ¾ and therefore the second idler cam sprocket 26 is offset by ¾ outer sprocket teeth to the first idler cam sprocket 24, or the first idler cam sprocket 24 is offset by ¼ outer sprocket teeth to the second idler cam sprocket 26. One-quarter phasing is thus obtained.

Those skilled in the art to which the invention pertains may make modifications and other embodiments employing the principles of this invention without departing-from its spirit or essential characteristics particularly upon considering the foregoing teachings.

The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. An idler sprocket system, comprising:

an idler shaft, three sprockets located in side-by-side relation along said idler shaft, said first sprocket and said second sprocket having a first number of internal spline teeth and a second number of outer sprocket teeth, said third sprocket having said first number of internal spline teeth and a third number of outer sprocket teeth, said third sprocket being an idler sprocket, and said internal spline teeth of said second sprocket being rotated with respect to said internal spline teeth of said first sprocket before location of said sprockets on said idler shaft such that said outer sprocket teeth of said second sprocket are circumferentially offset with respect to said outer sprocket teeth of said first sprocket.

2. The idler sprocket system of claim 1 wherein a snap ring is used to maintain said idler sprocket and said first and second sprockets in position along said idler shaft.

3. The idler sprocket system of claim 1 wherein said first sprocket and said second sprocket are drivingly connected by a pair of chains to a pair of engine camshafts, and said idler sprocket is drivingly connected by a chain to an engine crankshaft.

\* \* \* \* \*